US012190833B2

(12) United States Patent
Xiong et al.

(10) Patent No.: US 12,190,833 B2
(45) Date of Patent: Jan. 7, 2025

(54) METHOD AND DEVICE FOR BACKLIGHT DRIVING, AND COMPUTER EQUIPMENT

(71) Applicant: HKC CORPORATION LIMITED, Shenzhen (CN)

(72) Inventors: Zhi Xiong, Shenzhen (CN); Haoxuan Zheng, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/012,022

(22) PCT Filed: Jun. 14, 2022

(86) PCT No.: PCT/CN2022/098601
§ 371 (c)(1),
(2) Date: Jan. 5, 2023

(87) PCT Pub. No.: WO2023/273865
PCT Pub. Date: Jan. 5, 2023

(65) Prior Publication Data
US 2024/0233657 A1 Jul. 11, 2024

(30) Foreign Application Priority Data
Jun. 28, 2021 (CN) ......................... 202110722030.3

(51) Int. Cl.
*G09G 3/34* (2006.01)

(52) U.S. Cl.
CPC ....... *G09G 3/3426* (2013.01); *G09G 2310/08* (2013.01); *G09G 2320/0646* (2013.01)

(58) Field of Classification Search
CPC ............. G09G 3/3426; G09G 2310/08; G09G 2320/0646; G09G 3/34; G09G 3/2096;
(Continued)

(56) References Cited

U.S. PATENT DOCUMENTS

2005/0231263 A1 10/2005 Kawai
2010/0315408 A1 12/2010 Kang et al.
(Continued)

FOREIGN PATENT DOCUMENTS

CN 1811536 A 8/2006
CN 102340682 A 2/2012
(Continued)

OTHER PUBLICATIONS

International Search Report mailed Aug. 26, 2022, in corresponding International Application No. PCT/2022/098601, 5 pages.

*Primary Examiner* — Stephen G Sherman
(74) *Attorney, Agent, or Firm* — Maier & Maier, PLLC

(57) ABSTRACT

A method and a device for backlight driving, and a computer equipment. The method includes steps of: generating local dimming data, the local dimming data includes a frame refresh rate of a display panel and luminance data of each of a plurality of backlight zones; generating a gray-scale clock signal according to the frame refresh rate in the local dimming data, a frequency of the gray-scale clock signal is matched with the frame refresh rate in the local dimming data; generating drive data according to a plurality of luminance data in the local dimming data; and driving the plurality of backlight zones according to the gray-scale clock signal and the drive data.

15 Claims, 5 Drawing Sheets

(58) Field of Classification Search
CPC .. G09G 3/20; G09G 3/3406; G09G 2320/062; G09G 2320/0626; G09G 2340/0435
See application file for complete search history.

(56) References Cited

U.S. PATENT DOCUMENTS

| | | | | |
|---|---|---|---|---|
| 2011/0133673 | A1* | 6/2011 | Ryu | H05B 45/40 315/307 |
| 2013/0021386 | A1 | 1/2013 | Min et al. | |
| 2017/0263194 | A1* | 9/2017 | Kang | G09G 3/3406 |

FOREIGN PATENT DOCUMENTS

| | | | | |
|---|---|---|---|---|
| CN | 102890917 | A | 1/2013 | |
| CN | 106097983 | A | * 11/2016 | G09G 3/3406 |
| CN | 109461413 | A | 3/2019 | |
| CN | 109979401 | A | 7/2019 | |
| CN | 113506545 | A | 10/2021 | |
| JP | 2013205574 | A | 10/2013 | |

* cited by examiner

METHOD AND DEVICE FOR BACKLIGHT DRIVING, AND COMPUTER EQUIPMENT

CROSS-REFERENCE TO RELATED APPLICATIONS

This application is the national phase entry of International Application No. PCT/CN2022/098601, filed on Jun. 14, 2022, which is based upon and claims priority to the Chinese Patent Application No. 202110722030.3, filed on Jun. 28, 2021, the entire contents of which are incorporated herein by reference.

FIELD

The present application relates to the field of display technologies, and more particularly, to a method and a device for backlight driving and a computer equipment.

BACKGROUND

The display panel includes a backlight. To enhance the contrast of the display panel, the backlight of the display panel may be divided into multiple backlight zones and the luminance of light emitted from each backlight zone can be adjusted independently. Generally, a gray-scale clock signal (GCLK) and drive data are required for a backlight driver to drive the multiple backlight zones of the backlight. In particular, the gray-scale clock signal is used to determine the timing of light emission of each backlight zone during the display of a frame of image by the display panel.

SUMMARY

One objective of embodiments of the present application is to provide a method and a device for backlight driving, and a computer equipment, enabling the frequency of the gray-scale clock signal to be matched with a frame refresh rate of a display panel when the frame refresh rate of the display panel is changed, thereby enhancing the display effect of the display panel.

In a first aspect, a method for backlight driving is provided, which is applied to drive a backlight of a display panel, the backlight includes a plurality of backlight zones, and the method includes steps of: generating local dimming data, the local dimming data includes a frame refresh rate of the display panel and luminance data of each of the plurality of backlight zones; generating a gray-scale clock signal according to the frame refresh rate in the local dimming data, a frequency of the gray-scale clock signal is matched with the frame refresh rate in the local dimming data; generating drive data according to a plurality of luminance data in the local dimming data; and driving the plurality of backlight zones according to the gray-scale clock signal and the drive data.

Optionally, the before the local dimming data is generated, the method also includes steps of: obtaining image data of an image to be displayed and the frame refresh rate of the display panel; and determining the luminance data of each of the plurality of backlight zones according to the image data.

Optionally, the step of generating the gray-scale clock signal according to the frame refresh rate in the local dimming data includes a step of: determining, according to the frame refresh rate in the local dimming data, a target frequency by means of the following formula:

$$GCLK\ Rate = \frac{P}{\frac{1}{\text{Frame rate}} - \text{Dummy time}}$$

where GCLK Rate represents the target frequency, P represents the number of gray-scale clock signals during a display of a frame of image by the display panel, Frame rate represents the frame refresh rate in the local dimming data, and Dummy time represents blanking time during the display of a frame of image by the display panel. The method also includes a step of generating the gray-scale clock signal, and a frequency of the gray-scale clock signal is equal to the target frequency.

Optionally before the plurality of backlight zones are driven according to the gray-scale clock signal and the drive data, the method also includes a step of obtaining a frame synchronization signal. The driving the plurality of backlight zones according to the gray-scale clock signal and the drive data includes a step of driving the plurality of backlight zones according to the gray-scale clock signal, the frame synchronization signal and the drive data.

Optionally, the local dimming data also includes an index flag, the step of obtaining a frame synchronization signal includes a step of generating the frame synchronization signal according to the index flag in the local dimming data.

Optionally, the local dimming data includes an index field, a frame refresh rate field and a luminance data field. The frame refresh rate field is located between the index field and the luminance data field, the index field includes the index flag, the frame refresh rate field includes the frame refresh rate, and the luminance data field includes the plurality of luminance data.

In a second aspect, a device for backlight driving is provided, which is applied to drive a backlight of a display panel, the backlight includes a plurality of backlight zones, the device for backlight driving includes: a first generation module, a second generation module, a third generation module and a drive module.

The first generation module is configured to generate local dimming data. The local dimming data includes a frame refresh rate of the display panel and luminance data of each of the plurality of backlight zones.

The second generation module is configured to generate a gray-scale clock signal according to the frame refresh rate in the local dimming data. A frequency of the gray-scale clock signal is matched with the frame refresh rate in the local dimming data.

The third generation module is configured to generate drive data according to a plurality of luminance data in the local dimming data.

The drive module is configured to drive the plurality of backlight zones according to the gray-scale clock signal and the drive data.

Optionally, the device for backlight driving also includes a first acquisition module and a determination module. The first acquisition module is configured to obtain image data of an image to be displayed and the frame refresh rate of the display panel. The determination module is configured to determine the luminance data of each of the plurality of backlight zones according to the image data.

Optionally, the second generation module includes a determination unit and a generation unit.

The determination unit is configured to determine, according to the frame refresh rate in the local dimming data, a target frequency by means of the following formula:

$$GCLK\ Rate = \frac{P}{\frac{1}{\text{Frame rate}} - \text{Dummy time}}$$

where GCLK Rate represents the target frequency, P represents the number of gray-scale clock signals during a display of a frame of image by the display panel, Frame rate represents the frame refresh rate in the local dimming data, and Dummy time represents the blanking time during the display of a frame of image by the display panel.

The generation unit is configured to generate the gray-scale clock signal, and a frequency of the gray-scale clock signal is equal to the target frequency.

Optionally, the device for backlight driving also includes a second acquisition module configured to obtain a frame synchronization signal. The drive module is configured to drive the plurality of backlight zones according to the gray-scale clock signal, the frame synchronization signal and the drive data.

Optionally, the local dimming data also includes an index flag; the second acquisition module is configured to generate the frame synchronization signal according to the index flag in the local dimming data.

Optionally, the local dimming data includes an index field, a frame refresh rate field and a luminance data field. The frame refresh rate field is located between the index field and the luminance data field, the index field includes the index flag, the frame refresh rate field includes the frame refresh rate, and the luminance data field includes the plurality of luminance data.

In a third aspect, a computer equipment is provided. The computer equipment includes: a memory, a processor and a computer program stored in the memory and executable by the processor. The computer program, when being executed by the processor, causes the method for backlight driving as described in the first aspect to be implemented.

In a fourth aspect a computer readable storage medium is provided, in the computer readable storage medium, a computer program is stored, the computer program, when being executed by the processor, causes the method for backlight driving as described in the first aspect to be implemented.

It can be understood that the beneficial effects of the second, third and fourth aspects as described above can be found in the relevant descriptions in the first aspect and will not be repeated here.

In the present application, the local dimming data includes the frame refresh rate of the display panel and the luminance data of each of the plurality of backlight zones. The gray-scale clock signal is generated according to the frame refresh rate in the local dimming data, to enable the frequency of the gray-scale clock signal to be matched with the frame refresh rate in the local dimming data. The drive data is generated according to a plurality of luminance data in the local dimming data. In this way, when the plurality of backlight zones are driven according to the gray-scale clock signal and the drive data, the frequency of the gray-scale clock signal is always matched with the frame refresh rate of the display panel regardless of whether the frame refresh rate of the display panel is changed or not, thus the display effect of the display can be improved.

BRIEF DESCRIPTION OF THE DRAWINGS

In order to illustrate the solutions in the embodiments of the present application more clearly, a brief description of the drawings required for use in the description of the embodiments will be given below. It will be apparent that the drawings in the following description are only some embodiments of the present application, and that other drawings may also be obtained on the basis of these drawings without paying any creative labor for a person of ordinary skill in the art.

DETAILED DESCRIPTION

In order to make the objectives, solutions and advantages of the present application more comprehensible, the implementation of this application will be further described in detail below in conjunction with the drawings.

It should be understood that references to "a/the plurality of" in the present application refer to two or more. In the description of the present application, unless otherwise stated, the symbol "/" means or, for example, A/B may mean either A or B. The term "and/or" in here is simply a way of describing the association of related objects, indicating that three relationships may exist, for example, A and/or B, which may mean: A alone, both A and B, and B alone. In addition, to facilitate a clear description of the solutions of the present application, the words "first" and "second" are used to distinguish between identical or similar items that have essentially the same function and role. It will be understood by shilled artisans that the words "first", "second", etc. do not limit the number or order of execution, and that the words "first", "second", etc. are not necessarily different.

Before illustrating the embodiments of the present application in detail, the application scenarios of the present application are described in here.

The display panel includes a backlight, and in order to enhance the contrast of the display panel, the backlight of the display panel may be separated into multiple backlight zones, each backlight zone can be independently adjusted in terms of luminance. Generally, the device for backlight driving needs to drive the multiple backlight zones of the backlight according to a gray-scale clock signal and drive data. In particular, the gray-scale clock signal is used to determine the timing of light emission of each backlight zone during the display of a frame of image by the display panel, and the drive data is used to determine the luminance of light emitted from each backlight zone during the display of a frame of image by the display panel.

In the relevant technologies, the frequency of the gray-scale clock signal is fixed. However, with the development of display technology, display panels generally have at least two different frame refresh rates. If the frequency of the gray-scale clock signal does not match the frame refresh rate of the display panel after the frame refresh rate of the display panel is changed, the display effect of the display panel may be affected.

To this end, an embodiment of the present application provides a method for backlight driving, which enables the frequency of the gray-scale clock signal to be matched with the frame refresh rate of the display panel when the frame refresh rate of the display panel is changed, thereby enhancing the display effect of the display panel.

Figure 1:
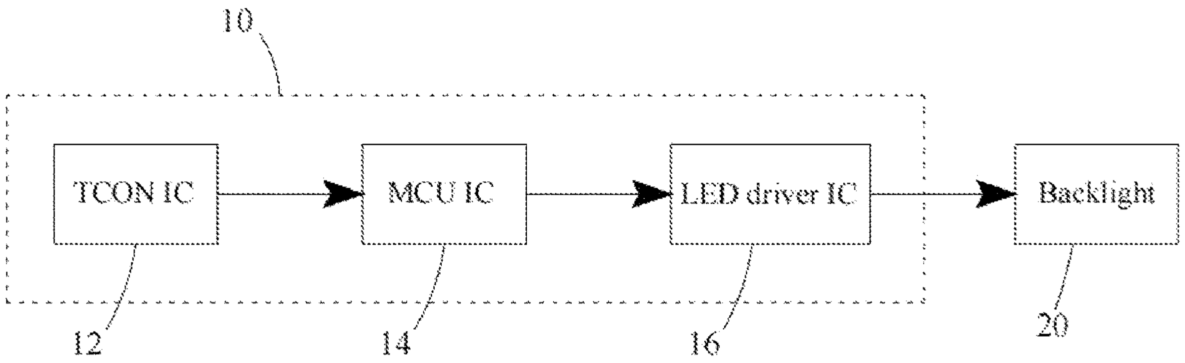
FIG. 1 is a schematic structural diagram of a computer equipment according to an embodiment of the present application.

The method for backlight driving provided by the embodiment of the present application may be applied to a computer equipment to drive a backlight of a display panel. The computer equipment may include a display panel. FIG. 1 is a schematic structural diagram of a computer equipment provided by an embodiment of the present application, as shown in FIG. 1, in some embodiments, the computer equipment 10 may include a timer control register integrated circuit (TCON IC) 12, a micro-controller unit integrated circuit (MCU IC) 14, and a light-emitting diode driver integrated circuit (LED driver IC) 16. The TCON IC 12, the MCU IC 14 and the LED driver IC 16 are cooperated to implement the method for backlight driving provided in the embodiment of the present application to drive the backlight of the display panel.

The method for backlight driving provided by an embodiment of the present application is explained in detail below.

Figure 2:
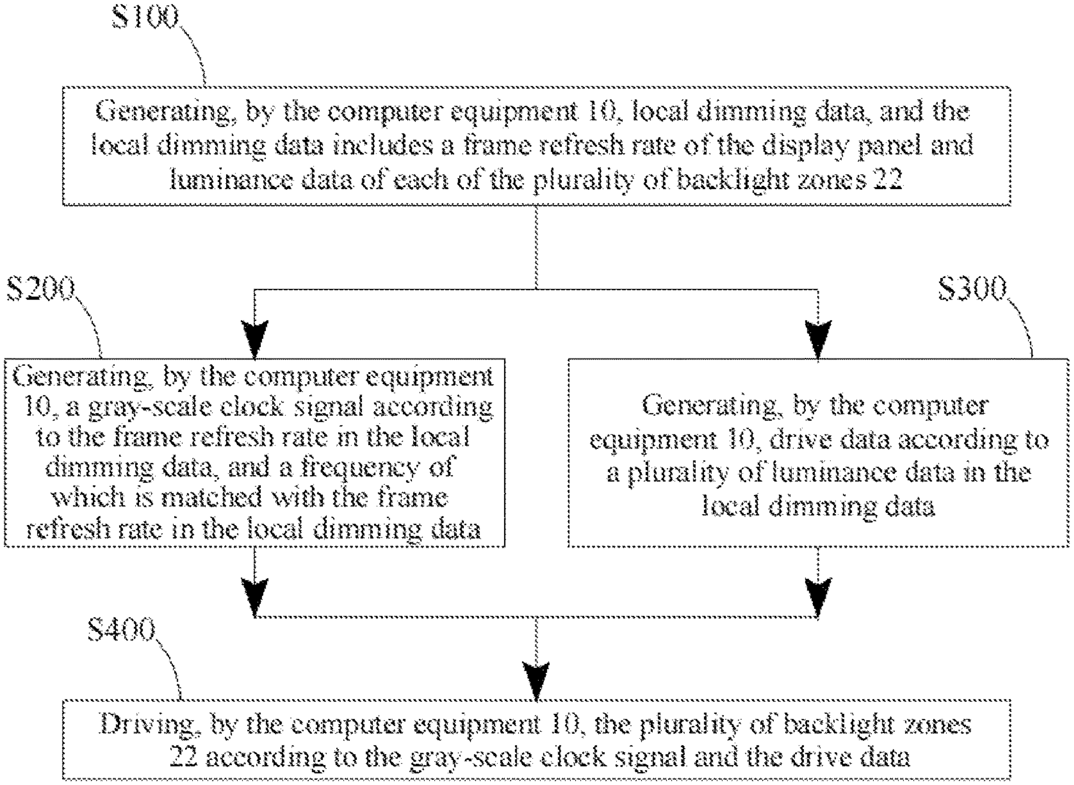
FIG. 2 is a first flowchart of a method for backlight driving according to an embodiment of the present application.
Figure 3:
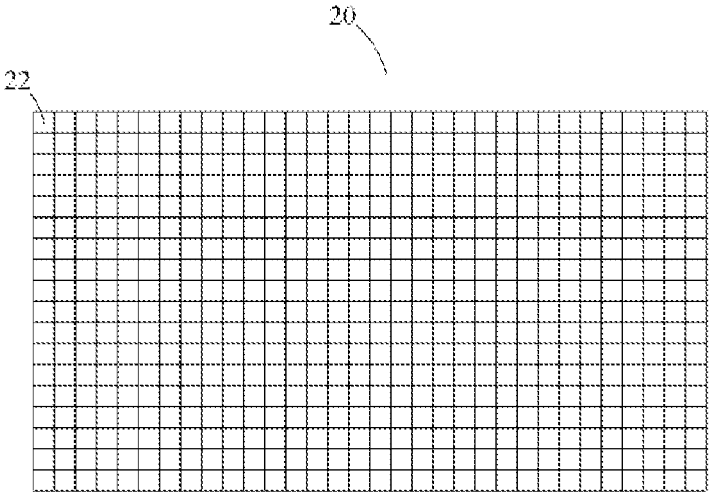
FIG. 3 is a schematic structural diagram of a backlight according to an embodiment of the present application.

FIG. 2 is a flowchart of a method for backlight driving provided by an embodiment of the present application. The method for backlight driving is used to drive a backlight 20 of a display panel. FIG. 3 is a schematic structural diagram of a backlight provided by an embodiment of the present application, as shown in FIG. 3, the backlight 20 of the display panel includes a plurality of backlight zones 22. Referring to FIG. 2, the method includes steps S100 to S400, as illustrated below.

In step S100, local dimming data is generated by the computer equipment 10, and the local dimming data includes a frame refresh rate of the display panel and luminance data of each of the plurality of backlight zones 22.

The display panel, when being in operation, will display a number of consecutive frames within a second, and the luminance at the same position of the display panel may change when different images are displayed. Generally, when the luminous brightness of a certain region of the image to be displayed is higher, the luminance of light emitted from the backlight zone 22 corresponding to this region is also higher when the image is displayed by the display panel. Conversely, when the luminous brightness of a certain region of the image to be displayed is lower, the luminance of light emitted from the backlight zone 22 corresponding to this region is also lower when the image is displayed by the display panel. In this way, a contrast ratio of the display panel can be increased. The local dimming data refers to data for adjusting the luminance of light emitted from the plurality of backlight zones 22 according to the image to be displayed. The local dimming data includes the luminance data of each of the plurality of backlight zones 22. The luminance data of a backlight zone 22 is used to indicate the luminance of light emitted from that backlight zone 22. In other words, the luminous of light emitted from a backlight zone 22 is a reflection of the luminance data of that backlight zone 22.

The local dimming data also includes the frame refresh rate of the display panel. The frame refresh rate of the display panel is the number of frames in a second at which the display panel displays an image. Generally, the display panel has at least two different frame refresh rates to allow the display panel to operate at different frame refresh rates in different application scenarios. For example, the display panel has a first refresh rate, which may be 60 Hz (Hz), and a second refresh rate, which may be 120 Hz. In a case that the image to be displayed on the display panel is a static image (such as a desktop or text-only web page), the display panel may be operated at the first refresh rate, where the display panel displays 60 frames per second. In case that the image to be displayed on the display panel is a dynamic image (such as a video or game being played on the display panel), the display panel may be operated at the second refresh rate, where the display panel displays 120 frames per second. In an embodiment of the present application, the local dimming data includes the frame refresh rate of the display panel, which is the real-time frame refresh rate of the display panel.

In some embodiments, the above step S100 may be performed by the TCON IC 12 in the computer equipment 10. That is, the local dimming data is generated by the TCON IC 12, and the local dimming data includes the frame refresh rate of the display panel and the luminance data of each of the plurality of backlight zones 22.

In step S200, a gray-scale clock signal is generated by the computer equipment 10 according to the frame refresh rate in the local dimming data, and a frequency of the gray-scale clock signal is matched with the frame refresh rate in the local dimming data.

Generally, each backlight zone 22 of the backlight 20 in the display panel includes a light-emitting device and a drive circuit for controlling the light-emitting device. The drive circuit is operated in response to both the scan signal and the drive signal, and only when both the scan signal and the drive signal are transmitted to the drive circuit, the drive circuit is turned on and the light-emitting device emits light. The gray-scale clock signal is used to determine an output timing of a scan signal. Generally, the gray-scale clock signal consists of a high-level signal and a low-level signal, the high-level signal and the low-level signal constitute the gray-scale clock signal. A switching of the gray-scale clock signal indicates a change in the timing of the scan signal. The frequency of the gray-scale clock signal refers to the number of gray-scale clock signals during the display of a frame of image by the display panel.

The gray-scale clock signal is generated by the computer equipment 10 according to the frame refresh rate in the local dimming data, thereby enabling the frequency of the gray-scale clock signal to be matched with the frame refresh rate in the local dimming data. In other words, the frequency of the gray-scale clock signal is matched with the frame refresh rate of the display panel, thereby avoiding the display effect being affected by the mismatch between the frequency of the gray-scale clock signal and the frame refresh rate of the display panel. Here, the frequency of the gray-scale clock signal is matched with the frame refresh rate in the local dimming data means that the frequency of the gray-scale clock signal varies with the frame refresh rate in the local dimming data, such that the frequency of the gray-scale clock signal becomes higher when the frame refresh rate of the display panel is switched from the first refresh rate to the second refresh rate, thereby when the display panel is operated at the second refresh rate to display an image, the gray-scale clock signal corresponding to that image is enabled to be run out within a frame duration of the image. Meanwhile, the frequency of the gray-scale clock signal becomes lower when the frame refresh rate of the display panel is switched from the second refresh rate to the first refresh rate, thereby when the display panel is operated at the first refresh rate to display an image, the gray-scale clock signal corresponding to that image does not run out too early in the frame duration of the image.

In some embodiments, the above step S200 may be performed by the MCU IC 14 in the computer equipment 10. That is, the gray-scale clock signal is generated by the MCU IC 14 according to the frame refresh rate in the local dimming data, and the frequency of the gray-scale clock signal is matched with the frame refresh rate in the local dimming data.

In some embodiments, the step S200 may include the following steps S210 and S220.

In step S210, a target frequency is determined by the computer equipment 10 according to the frame refresh rate in the local dimming data by means of the following formula:

$$GCLK\ Rate = \frac{P}{\frac{1}{\text{Frame rate}} - \text{Dummy time}}$$

where GCLK Rate represents the target frequency, P presents the number of gray-scale clock signals during a display of a frame of image by the display panel, a specific value of P is determined by hardware characteristics of the computer equipment 10. When the computer equipment 10 includes the TCON IC 12, the MCU IC 14 and the LED driver IC 16 as described above, the specific value of P is determined by the characteristics of the LED driver IC 16. Generally, P=X·N, X represents the number of rows of the plurality of backlight zones 22; N represents the number of gray-scale clock signals required to drive a row of backlight zones 22. Frame rate represents the frame refresh rate in local dimming data, an inverse of the Frame rate is the frame duration of the display panel at the current frame refresh rate. Dummy time is the blanking time during the display of a frame of image by the display panel, a specific value of Dummy time is determined by the hardware characteristics of the computer equipment 10. When the computing device 10 includes the TCON IC 12, the MCU IC 14 and the LED driver IC 16 as described above, the specific value is determined by the characteristics of the LED driver IC 16.

In step S220, a gray-scale clock signal is generated by the computer equipment 10, and the frequency of the gray-scale clock signal is equal to the target frequency.

The gray-scale clock signal, the frequency of which is equal to the target frequency, is generated by the computer equipment 10 after the target frequency is determined according to step S210. In this way, the frequency of the gray-scale clock signal is matched with the frame refresh rate in the local dimming data, i.e., the frequency of the gray-scale clock signal is matched with the frame refresh rate of the display panel.

In step S300, drive data is generated by the computer equipment 10 according to a plurality of luminance data in the local dimming data.

The drive data is a data signal used to drive the drive circuit in the backlight zone 22. Since the luminance data cannot be used directly to drive the backlight zone of the display panel, the computer equipment 10 may perform a format conversion of each of the plurality of luminance data to obtain the drive data. For example, in some embodiments, the luminance data may be a gray-scale value and the drive data may be a binary signal, and the computer equipment 10 is used to convert each gray-scale value to the corresponding drive data.

It will be appreciated that the sequence of the above steps S200 and S300 does not affect the implementation of the method for backlight driving. Thus, the above steps S200 and S300 may be performed sequentially or simultaneously. If steps S200 and S300 are performed sequentially, then the step S200 may be performed before the step S300 or may be performed follows the step S300, which will not be limited herein.

In some embodiments, the above step S300 may also be performed by the MCU IC 14 in the computer equipment 10. That is, the drive data is generated by the MCU IC 14 according to the plurality of luminance data in the local dimming data.

In step S400, the plurality of backlight zones 22 are driven by the computer equipment 10 according to the gray-scale clock signal and the drive data.

The drive circuit of each backlight zone 22 is driven by the computer equipment 10, according to the gray-scale clock signal and the drive data, after the gray-scale clock signal and the drive data are obtained by the computer equipment 10.

In some embodiments, the above step S400 is performed by the LED driver IC 16 in the computer equipment 10. That is, the drive circuit of each backlight zone 22 is driven by the LED driver IC 16 according to the gray-scale clock signal and the drive data. Generally, the LED driver IC 16, when being in operation, outputs a scan signal and a drive signal to the light-emitting circuit of the backlight zone 22 in response to the gray-scale clock signal and the drive data, thereby controlling the plurality of backlight zones 22 to emit light one by one.

In the embodiments of the present application, the local dimming data generated by the computer equipment 10 includes the frame refresh rate of the display panel and the luminance data of each of the plurality of backlight zones 22. The gray-scale clock signal is generated according to the frame refresh rate in the local dimming data, to enable the frequency of the gray-scale clock signal to be matched with the frame refresh rate in the local dimming data. The drive data is generated according to a plurality of luminance data in the local dimming data. In this way, when the plurality of backlight zones 22 are driven according to the gray-scale clock signal and the drive data, the frequency of the gray-scale clock signal is always matched with the frame refresh rate of the display panel regardless of whether the frame refresh rate of the display panel is changed or not, and thus the display effect of the display panel can be improved.

Figure 4:
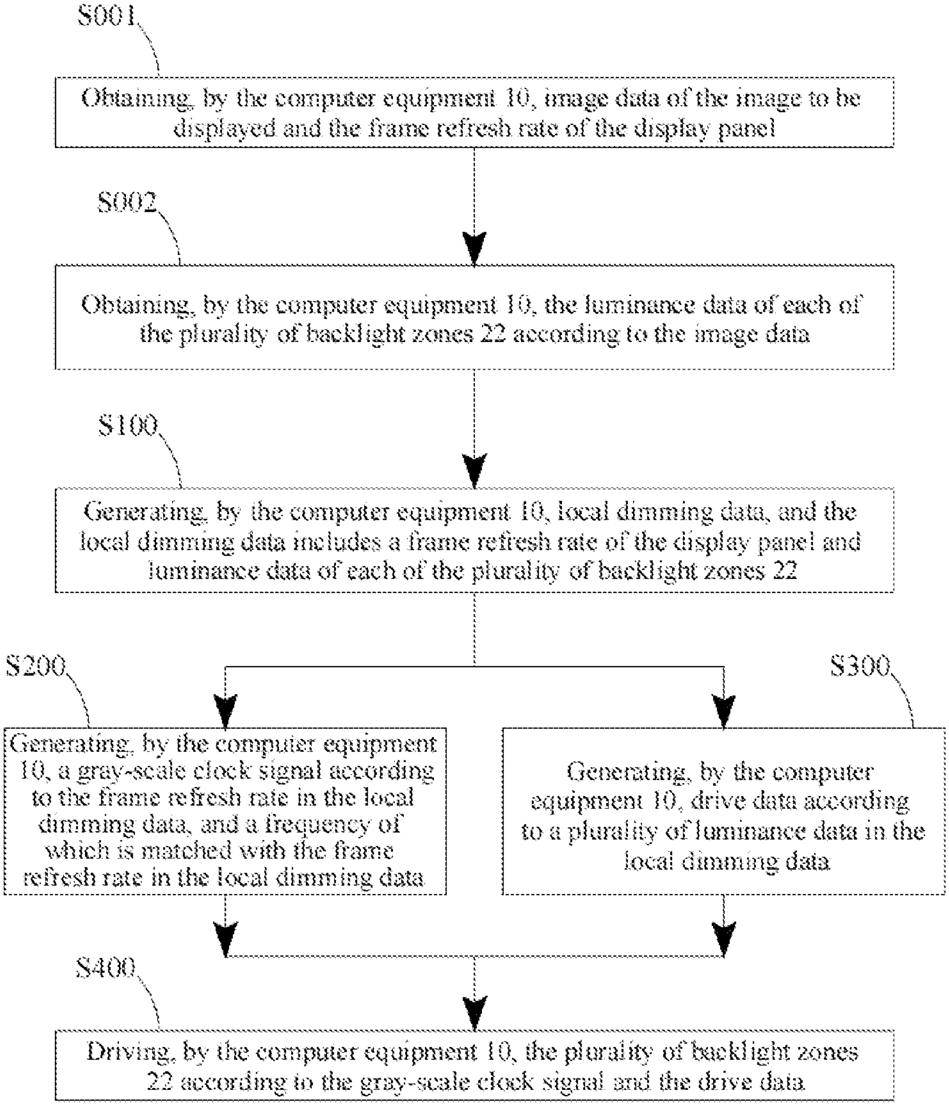
FIG. 4 is a second flowchart of a method for backlight driving according to an embodiment of the present application.

In some embodiments, as shown in FIG. 4, step S100 is preceded by the following steps S001 and S002.

In step S001, image data of the image to be displayed and the frame refresh rate of the display panel are obtained by the computer equipment 10.

The computer equipment 10 may include a host device. The image data of the image to be displayed and the frame refresh rate of the display panel may be output by the host device. Here the host device may, for example, be a host of a personal computer, or a central processor of a mobile terminal, etc. The computer equipment 10 may be connected to the host device, to obtain the image data of the image to be displayed and the frame refresh rate of the display panel output by the host device while the host device is in operation.

The above step S001 may be performed by the TCON IC 12 in the computer equipment 10. That is, the image data of the image to be displayed and the frame refresh rate of the display panel are acquired by the TCON IC 12.

In step S002, the luminance data of each of the plurality of backlight zones 22 is determined by the computer equipment 10 according to the image data.

The luminance data of each of the plurality of backlight zones 22 is determined by the computer equipment 10, according to the image data of the image to be displayed, after the image data of the image to be displayed is obtained by the computer equipment 10. In some embodiments, if it is assumed that each backlight zone 22 of the display panel corresponds to Y pixels, then for any backlight zone 22, the luminance data of Y pixels corresponding to this backlight zone 22 in the image data can be obtained after the image data of the image to be displayed is obtained by the computer equipment 10. In this way, an average value of the luminance data of Y pixels of this backlight zone 22 can be calculated and determined by the computer equipment 10, to be used as a reference value for the luminance data of this backlight zone 22. The luminance data of this backlight zone 22 is determined by the computer equipment 10 according to the reference value of the luminance data of this backlight zone 22. The luminance data of this backlight zone 22 determined by the computer equipment 10 should be the luminance data closest to this reference value among the plurality of luminance data. In alternative embodiments, a weighted value of the luminance data of Y pixels of this backlight zone 22 may be calculated and determined by the computer equipment 10, to be used as the reference value for the luminance data of this backlight zone 22.

The above step S002 may be performed by the TCON IC 12 in the computer equipment 10. That is, the luminance data of each of the plurality of backlight zones 22 is determined by the TCON IC 12 according to the image data.

Figure 5:
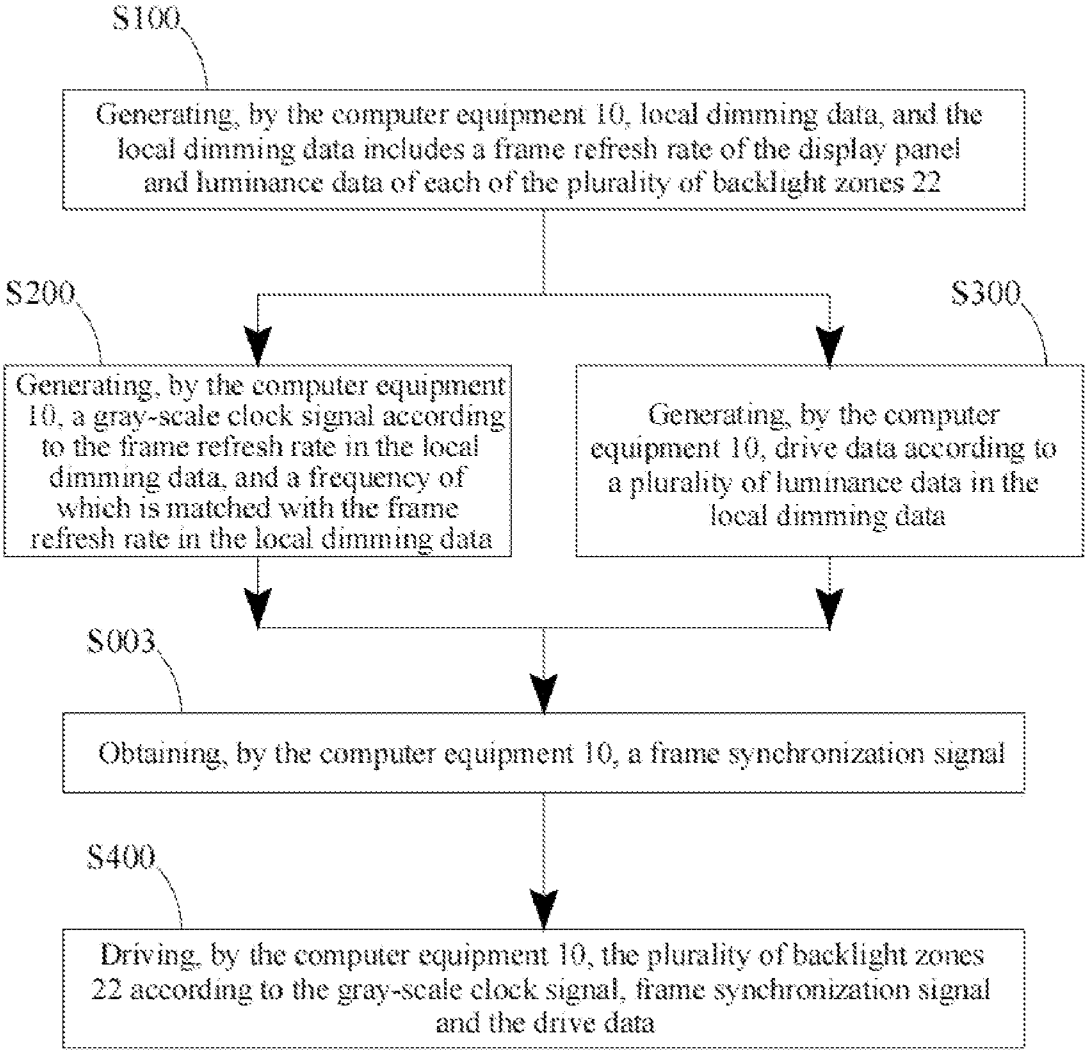
FIG. 5 is a third flowchart of a method for backlight driving according to an embodiment of the present application.

In some embodiments, as shown in FIG. 5, step S400 may be preceded by step S003.

In step S003, a frame synchronization signal is obtained by the computer equipment 10.

In this case, the above step S400 may specifically include that the backlight zone 22 is driven by the computing device 10 according to the gray-scale clock signal, the frame synchronization signal and the drive data.

The frame synchronization signal is used to instruct the computer equipment 10 to drive the backlight zone 22 so that the light-emission of the backlight zone 22 is synchronized with the image to be displayed. During the display of a frame of image by the display panel, the plurality of backlight zones 22 of the backlight 20 needs to be driven by the computing device 10 to emit light in turn. For the sake of description, it is assumed that the backlight 20 includes M backlight zones 22, and then the first backlight zone 22, the second backlight zone 22 to emit light . . . the M-th backlight zone 22 are driven by the computer equipment 10 to emit light in turn during the display of a frame of image by the display panel. The frame synchronization signal is used in such a way that when the frame synchronization signal is received by the computer equipment 10, the first backlight zone 22 is driven by the computer equipment 10 according to the frame synchronization signal to emit light. The gray-scale clock signal is used in such a way that when the gray-scale clock signal is received by the computer equipment 10, the M backlight zones 22 are driven by the computer equipment 10 in turn according to the gray-scale clock signal to emit light. The drive data is used to determine the luminance of the light emitted from each backlight zone 22. In other words, a frame of image is displayed by the display panel between two frame synchronization signals, during which the plurality of backlight zones 22 are driven by the computer equipment 10 according to the gray-scale clock signal and the drive data to emit light in turn.

In an exemplary embodiment, the frame synchronization signal may also be output by the host device. In other words, when the host device is in operation, the image data of the image to be displayed, the frame refresh rate of the display panel and the frame synchronization signal may be output by the host device to the computer equipment 10. In this case, the above steps S001, S003, S002, S100, S200, S300 and S400 are performed by the computer equipment 10 in sequence.

In case that the frame synchronization signal is output by the host device, the above step S003 may be performed by the TCON IC 12 in the computing device 10. The TCON IC 12 obtains the frame synchronization signal and outputs the frame synchronization signal to the MCU IC 14. The MCU IC 14 obtains the frame synchronization signal and outputs the frame synchronization signal to the LED driver IC 16 to control the LED driver IC 16 to drive the plurality of backlight zones 22.

In another exemplary embodiment, the local dimming data also includes an index flag. In this case, the step S100 may specifically include that: the local dimming data is generated by the computer equipment 10, and the local dimming data includes an index flag, the frame refresh rate of the display panel and the luminance data of each of the plurality of backlight zones 22. The index flag is used to mark the beginning of a frame of image. In this case, the step S003 may specifically include that: the frame synchronization signal is generated by the computer equipment 10 according to the index flag in the local dimming data.

Figure 6:
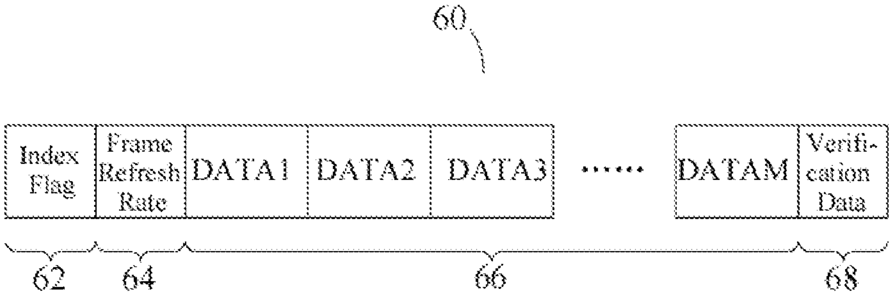
FIG. 6 is a data structure diagram of local dimming data according to an embodiment of the present application.

Specifically, FIG. 6 is a data structure diagram of local dimming data in accordance with an embodiment of the present application, as shown in FIG. 6, the local dimming data may include an index field 62, a frame refresh rate field 64, and a luminance data field 66. The frame refresh rate field 64 is located between the index field 62 and the luminance data field 66. The index field 62 includes the index flag, the frame refresh rate field 64 includes the frame refresh rate, and the luminance data field 66 includes the plurality of luminance data. In the embodiment shown in FIG. 6, the backlight 20 may have M backlight zones 22 and the local dimming data includes M luminance data corresponding to the M backlight zones 22. The M luminance data are denoted by DATA1, DATA2 . . . DATAM respectively.

Further, as shown in FIG. 6, the local dimming data may also include a verification field 68, which is located after the luminance data field 66. The verification field 68 includes verification data. The verification data is used to perform data verification to protect the integrity of the data.

In case that the local dimming data includes an index flag, the above step S003 may be performed by the MCU IC 14 in the computer equipment 10. That is, after the local dimming data is obtained by the MCU IC 14, the frame synchronization signal is generated by index flag according to the index flag in the local dimming data.

Figure 7:
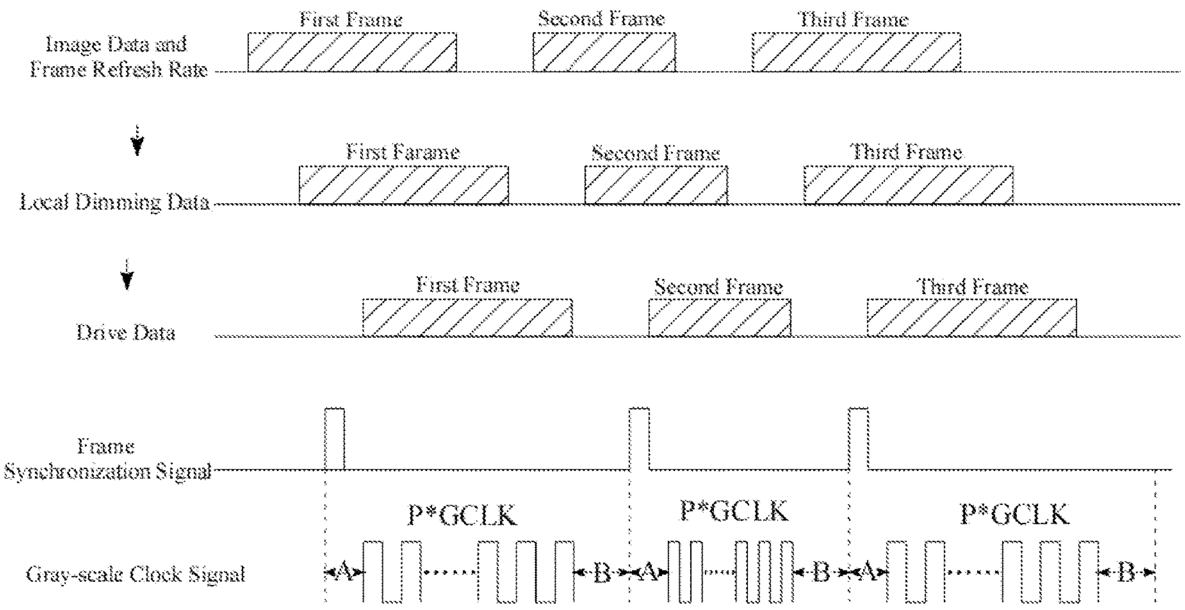
FIG. 7 is a schematic diagram of a data transmission according to an embodiment of the present application.

FIG. 7 is a schematic diagram of a data transmission in accordance with an embodiment of the present application.

The operation process of the method for backlight driving of the present application is explained below in conjunction with FIG. 7, from a specific embodiment. In this embodiment, the backlight 20 includes M backlight zones 22 and the computer equipment 10 includes the TCON IC 12, the MCU IC 14 and the LED driver IC 16. The method for backlight driving includes that:

The image data of the image to be displayed and the frame refresh rate of the display panel output by the host device are obtained by TCON IC 12. The frame refresh rate of the display panel is the real-time refresh rate of the image to be displayed. In the embodiment shown in FIG. 7, the image to be displayed includes a first frame of image, a second frame of image and a third frame of image. In case that the image to be displayed is the first frame of image, the image data and frame refresh rate of the first frame of image output by the host device are obtained by the TCON IC 12. In case that the image to be displayed is the second frame of image, the image data and frame refresh rate of the second frame of image output by the host device are obtained by the TCON IC 12. In case that the image to be displayed is the third frame of image, the image data and frame refresh rate of the third frame of image output by the host device are obtained by the TCON IC 12. In the embodiment shown in FIG. 7, the frame refresh rate of the first frame of image is the same as that of the third frame of image, and the frame refresh rate of the second frame of image is higher than that of the first frame of image.

After the image data of the image to be displayed is obtained by the TCON IC 12, the luminance data of each of the M backlight zones 22 is determined by the TCON IC 12 according to the image data of the image to be displayed. Afterwards, the local dimming data is generated by the TCON IC 12, and the local dimming data includes the index field 62, the frame refresh rate field 64, the luminance data field 66 and the verification field 68. The index flag is included in index field 62, the frame refresh rate of the display panel is included in the frame refresh rate field 64, and the M luminance data is included in the luminance data field 66. Each luminance data is used to determine the luminance of light emitted from one backlight zone 22. The verification data is included in the verification field 68.

After the local dimming data is generated by the TCON IC 12, the local dimming data is output by the TCON IC 12 to the MCU IC 14. After the local dimming data is obtained by the MCU IC 14, on the one hand, the frame synchronization signal is generated by the MCU IC 14 according to the index flags in the local dimming data. On the other hand, the target frequency is determined by the MCU IC 14 according to the frame refresh rate in the local dimming data by means of the following formula, and then the gray-scale clock signal, the frequency of which is equal to the target frequency, is generated by the MCU IC 14.

$$GCLK\ Rate = \frac{P}{\frac{1}{\text{Frame rate}} - \text{Dummy time}}$$

In the embodiment shown in FIG. 7, the sum of time A and time B is the blanking time Dummy time corresponding to each frame of the image to be displayed. As can be seen from FIG. 7, when the image to be displayed is switched from the first frame of image to the second frame of image, as the frame refresh rate increases, the frame duration becomes shorter and the frequency of the gray-scale clock signal becomes higher, to enable the frequency of the gray-scale clock signal to be matched with the frame refresh rate in the local dimming data, i.e., to enable the frequency of the gray-scale clock signal to be matched with the frame refresh rate of the display panel. On the other hand, a format conversion is performed on the M luminance data in the local dimming data by the MCU IC 1 to generate the drive data.

After the frame synchronization signal, gray-scale clock signal and drive data are generated, the MCU IC 14 will output the frame synchronization signal, gray-scale clock signal and drive data to the LED driver IC 16 to control the LED driver IC 16 to operate. During the operation of the LED driver IC 16, the M backlight zones 22 are driven to emit light in turn, and the luminance of light emitted from each backlight zone 22 corresponds to a piece of luminance data.

In the embodiments of the present application, the local dimming data includes the frame refresh rate of the display panel and the luminance data of each of the plurality of backlight zones 22. The gray-scale clock signal is generated according to the frame refresh rate in the local dimming data to enable the frequency of the gray-scale clock signal to be matched with the frame refresh rate in the local dimming data. The drive data is generated according to a plurality of luminance data in the local dimming data. In this way, when the plurality of backlight zones 22 are driven according to the gray-scale clock signal and the drive data, the frequency of the gray-scale clock signal is always matched with the frame refresh rate of the display panel regardless of whether the frame refresh rate of the display panel is changed or not, thereby the display effect of the display panel can be enhanced. The method for backlight driving is also configured to obtain the frame synchronization signal and to drive the plurality of backlight zones 22 according to the frame synchronization signal, so that the light-emission of the backlight zone 22 is synchronized with the image to be displayed, which further improves the display effect of the display panel.

Figure 8:
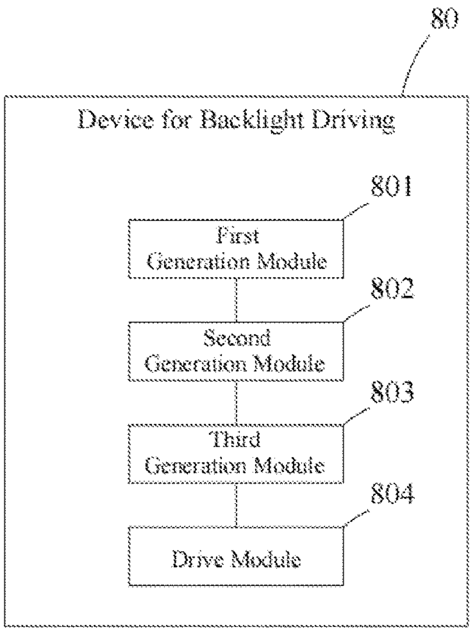
FIG. 8 is a schematic structural diagram of a device for backlight driving according to an embodiment of the present application.

FIG. 8 is a schematic structural diagram of a device for backlight driving 80 in accordance with an embodiment of the present application. The device for backlight driving 80 is applied to drive a backlight of a display panel, and the backlight includes a plurality of backlight zones. As shown in FIG. 8, the device for backlight driving 80 includes a first generation module 801, a second generation module 802, a third generation module 803, and a drive module 804.

The first generation module 801 is configured to generate local dimming data, the local dimming data includes a frame refresh rate of the display panel and luminance data of each of the plurality of backlight zones.

The second generation module 802 is configured to generate a gray-scale clock signal according to the frame refresh rate in the local dimming data. A frequency of the gray-scale clock signal is matched with the frame refresh rate in the local dimming data.

The third generation module 803 is configured to generate drive data according to a plurality of luminance data in the local dimming data.

The drive module 804 is configured to drive the plurality of backlight zones according to the gray-scale clock signal and the drive data.

Optionally, the device for backlight driving 80 further includes a first acquisition module and a determination module.

The first acquisition module is configured to obtain image data of the image to be displayed and the frame refresh rate of the display panel.

The determination module is configured to determine the luminance data of each of the plurality of backlight zones according to the image data.

Optionally, the second generating module 802 includes a determination unit and a generation unit.

The determination unit is configured to determine, according to the frame refresh rate in the local dimming data, a target frequency by means of the following formula:

$$GCLK\ Rate = \frac{P}{\frac{1}{\text{Frame rate}} - \text{Dummy time}}$$

where GCLK Rate represents the target frequency, P represents the number of gray-scale clock signals during a display of a frame of image by the display panel, Frame rate represents the frame refresh rate in the local dimming data, and Dummy time represents the blanking time during the display of a frame of image by the display panel.

The generation unit is configured to generate a gray-scale clock signal, and a frequency of the gray-scale clock signal is equal to the target frequency.

Optionally, the device for backlight driving 80 also includes a second acquisition module and a drive module 804.

The second acquisition module is configured to obtain a frame synchronization signal.

The drive module 804 is configured to drive the plurality of backlight zones according to the gray-scale clock signal, the frame synchronization signal and the drive data.

Optionally, the local dimming data also includes an index flag, and the second acquisition module is configured to generate the frame synchronization signal according to the index flag in the local dimming data.

Optionally, the local dimming data includes an index field, a frame refresh rate field and a luminance data field, the frame refresh rate field is located between the index field and the luminance data field, the index flag is included in the index field, the frame refresh rate is included in the frame refresh rate field, and the plurality of luminance data is included in the luminance data field.

In the embodiments of the present application, the local dimming data includes the frame refresh rate of the display panel and the luminance data of each of the plurality of backlight zones. The gray-scale clock signal is generated according to the frame refresh rate in the local dimming data to enable the frequency of the gray-scale clock signal to be matched with the frame refresh rate in the local dimming data. The drive data is generated according to the plurality of luminance data in the local dimming data. In this way, when the plurality of backlight zones are driven according to the gray-scale clock signal and the drive data, the frequency of the gray-scale clock signal is always matched with the frame refresh rate of the display panel regardless of whether the frame refresh rate of the display panel is changed or not, thereby the display effect of the display panel can be enhanced. The device for backlight driving 80 is also configured to obtain a frame synchronization signal and to drive the plurality of backlight zones according to the frame synchronization signal, so that the light-emission of the backlight zone is synchronized with the image to be displayed, which further improves the display effect of the display panel.

It should be noted that the device for backlight driving 80 provided in the above embodiment to drive the plurality of backlight zones of the backlight, the division of each of the above functional modules is provide only by way of example, in practice, the above functions may be assigned to be completed by different functional modules according to actual needs, i.e., the internal structure of the device is divided into different functional modules to complete all or part of the above described functions.

The functional units and modules in the above embodiments may be integrated in a single processing unit, or each unit may be existed physically separately, or two or more units may be integrated in a single unit, and the integrated unit may be implemented either in the form of hardware or in the form of software functional units. Furthermore, the specific names of the various functional units and modules are only for the purpose of distinguishing them from each other and are not intended to limit the protection scope of the embodiments of the present application.

The device for backlight driving 80 provided in the above embodiment has the same concept as that of the method embodiment for backlight driving. The specific operation process of the units and modules in the above embodiment and the effects brought about may be found in the above method embodiments, which will not be repeated here.

Figure 9:
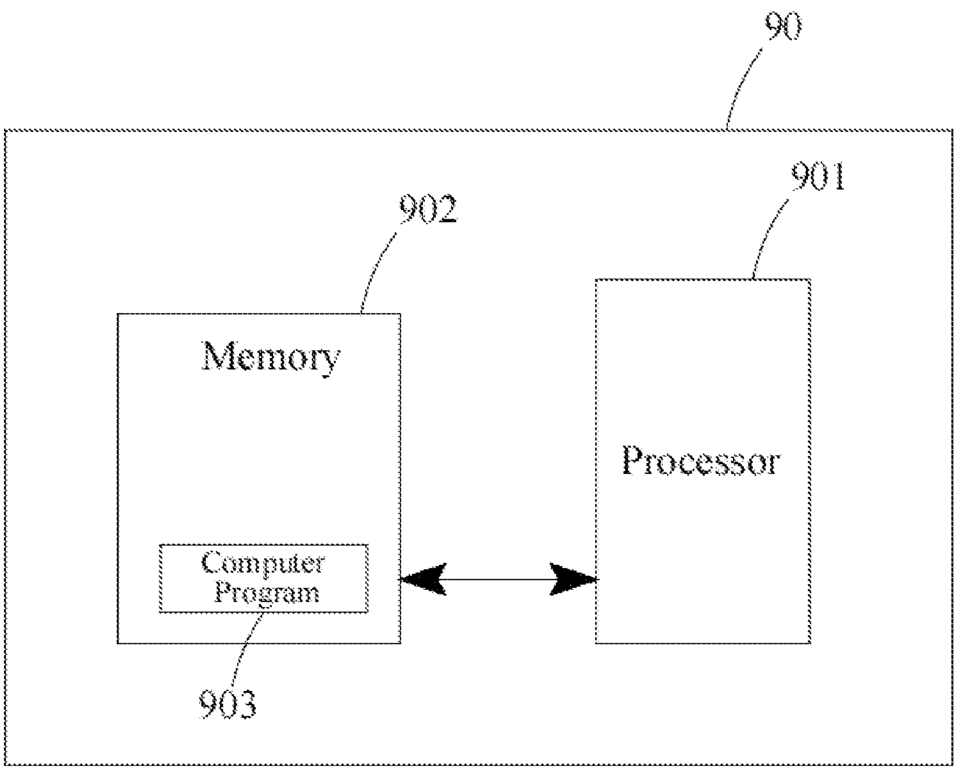
FIG. 9 is a schematic structural diagram of a computer equipment according to an embodiment of the present application.

FIG. 9 is a schematic structural diagram of a computer equipment in accordance with an embodiment of the present application. As shown in FIG. 9, the computer equipment 90 includes: a processor 901, a memory 902, and a computer program 903 stored in the memory 902 and executable by the processor 901. The processor 901, when executing the computer program 903, is configured to implement the steps in the method for backlight driving in the above-described embodiment.

The computer equipment 90 may be a general-purpose computer equipment or a dedicated computer equipment. In specific implementations, the computer equipment 90 may be a desktop computer, a portable computer, a network server, a handheld computer, a mobile phone, a tablet computer, a wireless terminal device, a communication device or an embedded device, and the embodiments of the present application do not limit the type of computer equipment 90. It will be understood by those skilled in the art that FIG. 9 is merely an example of computer equipment 90 and does not constitute a limitation of computer equipment 90. The computer equipment 90 may include more or fewer components than shown, or a combination of certain components, or different components, such as the computer equipment 90 may also include input and output devices, network access devices, etc.

The processor 901 may be a Central Processing Unit (CPU), the processor 901 may also be other general-purpose processors, a Digital Signal Processor (DSP), an Application Specific Integrated Circuit (ASIC), a Field-Programmable Gate Array (FPGA) or other programmable logic devices, discrete gate or transistor logic devices, discrete hardware components, etc. The general-purpose processor may be a microprocessor or may also be any conventional processor.

In some embodiments, the memory 902 may be an internal storage unit of computer equipment 90, such as a hard disk or memory of computer equipment 90. In other embodiments, the memory 902 may also be an external storage device of computer equipment 90, such as a plug-in hard disk equipped on computer equipment 90, a Smart Media Card (SMC), a Secure Digital (SD) card, a Flash Card, etc. Further, the memory 902 may also include both internal and external storage units of the computer equipment 90. The memory 902 is used to store operation systems, applications, boot loaders, data, and other programs, such as program code for computer programs, etc. The memory 902 may also be used to temporarily store data that has been output or will be output.

In accordance with an embodiment of the present application, a computer equipment is also provided, which includes: at least one processor, a memory and a computer program stored in the memory and executable by the at least one processor. The processor, when executing the computer program, is configured to implement the steps in any of the method embodiments as described above.

In accordance with an embodiment of the present application, a computer readable storage medium is also provided. In the computer readable storage medium, a computer program is stored that, when being executed by the processor, causes the steps of the method in any of the above-described embodiments to be implemented.

In accordance with an embodiment of the present application, a computer program product is provided, which, when being run on a computer, causes the computer to perform the steps of the method in any of the above-described embodiments.

The integrated unit, when implemented as a software functional unit and sold or used as a stand-alone product, may be stored in a computer readable storage medium. Based on this understanding, the present application implements all or part of the processes in the method embodiments as described above, which may be accomplished by instructing the relevant hardware by means of a computer program, which may be stored in a computer readable storage medium. The computer program, when being executed by a processor, causes the steps of the method in any of the above-described embodiments to be implemented. The computer program includes a computer program code, which may be in the form of source code, object code, an executable file or some intermediate form, etc. The computer readable medium may include at least: any entity or device capable of carrying the computer program code to a photographic device/terminal device, a recording medium, a computer memory, a Read-Only Memory (ROM), a Random Access Memory (RAM), a Compact Disc Read-Only Memory (CD-ROM), a magnetic tape, floppy disks and optical data storage devices, etc. The computer readable storage media referred to in this application may be non-volatile storage media, in other words, may be non-transitory storage media.

It should be understood that the implementation of all or some of the steps the above embodiments may be achieved by software, hardware, firmware, or any combination thereof. When implemented using software, all or part of them may be implemented in the form of a computer program product. The computer program product includes one or more computer instructions. The computer instructions may be stored in a computer readable storage medium as described above.

In the above embodiments, the description of each embodiment has its own focus and the parts not detailed or documented in a particular embodiment, references may be made to the relevant descriptions of other embodiments.

It will be appreciated by person of ordinary skill in the art that the units and algorithmic steps described in conjunction with the embodiments disclosed herein may be implemented by electronic hardware, or a combination of computer software and electronic hardware. Whether these functions are performed in hardware or software depends on the particular application and design constraints of the solution. Skilled artisans may use different methods to implement the described functions for each particular application, but such implementations should not be considered as going beyond the scope of the present application.

In the embodiments provided in this application, it should be understood that the devices/computer equipment and methods disclosed, may be implemented in other ways. For example, the embodiments of devices/computer equipment described above are merely schematic, e.g. the division of modules or units, which is only a logical functional division, may be divided in other ways when actually implemented, such as, multiple units or components may be combined or may be integrated into another system, or some features may be ignored, or not implemented. On another point, the mutual coupling or direct coupling or communication connections shown or discussed may be indirect coupling or communication connections via some interface, device or unit, which may be electrical, mechanical or otherwise.

The units illustrated as separate components may or may not be physically separated, and the components shown as units may or may not be physical units, i.e., they may be located in one place or may also be distributed over a plurality of network units. Some or all of these units may be selected according to actual needs to achieve the objective of the solution in this embodiment.

The above-described embodiments are merely intended to illustrate the solutions of the present application and are not intended to limit the present application. Although the present application is described in detail with reference to the above embodiments, it should be understood by those of ordinary skill in the art that it is still possible to modify the solutions described in the above embodiments or to make equivalent substitutions of some of the features in the embodiments; and that these modifications or substitutions do not make the essence of the corresponding solutions deviate from the spirit and scope of the solutions of the embodiments of the present application, and shall all be included within the protection scope of the present application.

What is claimed is:

1. A method for backlight driving, applied to drive a backlight of a display panel, the backlight comprising a plurality of backlight zones, the method comprising:

generating local dimming data, the local dimming data comprising a frame refresh rate of the display panel and luminance data of each of the plurality of backlight zones;

generating a gray-scale clock signal according to the frame refresh rate in the local dimming data, a frequency of the gray-scale clock signal being matched with the frame refresh rate in the local dimming data;

generating drive data according to a plurality of luminance data in the local dimming data; and driving the plurality of backlight zones according to the gray-scale clock signal and the drive data, wherein the generating of the gray-scale clock signal according to the frame refresh rate in the local dimming data, comprises:

determining a target frequency according to the frame refresh rate in the local dimming data by a formula:

$$GCLK\ Rate = \frac{P}{\frac{1}{\text{Frame rate}} - \text{Dummy time}}$$

wherein GCLK Rate represents the target frequency, P represents the number of gray-scale clock signals during a display of a frame of image by the display panel, Frame rate represents the frame refresh rate in the local dimming data, and Dummy time represents blanking time during the display of a frame of image by the display panel; and generating the gray-scale clock signal, wherein a frequency of the gray-scale clock signal is equal to the target frequency.

2. The method as claimed in claim 1, wherein, before the local dimming data is generated, the method further comprises:

obtaining image data of an image to be displayed and the frame refresh rate of the display panel; and determining the luminance data of each of the plurality of backlight zones according to the image data.

3. The method as claimed in claim 2, wherein, before the plurality of backlight zones are driven according to the gray-scale clock signal and the drive data, the method further comprises:

obtaining a frame synchronization signal; and the driving the plurality of backlight zones according to the gray-scale clock signal and the drive data comprises:

driving the plurality of backlight zones according to the gray-scale clock signal, the frame synchronization signal and the drive data.

4. The method as claimed in claim 1, wherein, before the plurality of backlight zones are driven according to the gray-scale clock signal and the drive data, the method further comprises:

obtaining a frame synchronization signal; and the driving the plurality of backlight zones according to the gray-scale clock signal and the drive data comprises:

driving the plurality of backlight zones according to the gray-scale clock signal, the frame synchronization signal and the drive data.

5. The method as claimed in claim 4, wherein the local dimming data further comprises an index flag, and the obtaining a frame synchronization signal further comprises:

generating the frame synchronization signal according to the index flag in the local dimming data.

6. The method as claimed in claim 5, wherein the local dimming data comprises an index field, a frame refresh rate field and a luminance data field, the frame refresh rate field is located between the index field and the luminance data field, the index field comprises the index flag, the frame refresh rate field comprises the frame refresh rate, and the luminance data field comprises the plurality of luminance data.

7. The method as claimed in claim 1, wherein, before the plurality of backlight zones are driven according to the gray-scale clock signal and the drive data, the method further comprises:

obtaining a frame synchronization signal; and the driving the plurality of backlight zones according to the gray-scale clock signal and the drive data comprises:

driving the plurality of backlight zones according to the gray-scale clock signal, the frame synchronization signal and the drive data.

8. Computer equipment, comprising: a memory, a processor and a computer program stored in the memory and executable by the processor, wherein the computer program, when being executed by the processor, causes the computer equipment to perform operations to drive a backlight of a display panel, and the operations comprise:

generating local dimming data, the local dimming data comprising a frame refresh rate of the display panel and luminance data of each of the plurality of backlight zones;

generating a gray-scale clock signal according to the frame refresh rate in the local dimming data, a frequency of the gray-scale clock signal being matched with the frame refresh rate in the local dimming data;

generating drive data according to a plurality of luminance data in the local dimming data; and driving the plurality of backlight zones according to the gray-scale clock signal and the drive data, wherein the operation of generating a gray-scale clock signal according to the frame refresh rate in the local dimming data comprises:

determining a target frequency according to the frame refresh rate in the local dimming data by a formula:

$$GCLK\ Rate = \frac{P}{\frac{1}{\text{Frame rate}} - \text{Dummy time}}$$

wherein GCLK Rate represents the target frequency, P represents the number of gray-scale clock signals during a display of a frame of image by the display panel, Frame rate represents the frame refresh rate in the local dimming data, and Dummy time represents blanking time during the display of a frame of image by the display panel; and generating the gray-scale clock signal, wherein a frequency of the gray-scale clock signal is equal to the target frequency.

9. The computer equipment as claimed in claim 8, wherein, before the local dimming data is generated, the operations further comprise:

obtaining image data of an image to be displayed and the frame refresh rate of the display panel; and determining the luminance data of each of the plurality of backlight zones according to the image data.

10. The computer equipment as claimed in claim 9, wherein before the plurality of backlight zones are driven according to the gray-scale clock signal and the drive data, the operations further comprise:

obtaining a frame synchronization signal; and the driving the plurality of backlight zones according to the gray-scale clock signal and the drive data comprises:

driving the plurality of backlight zones according to the gray-scale clock signal, the frame synchronization signal and the drive data.

11. The computer equipment as claimed in claim 8, wherein before the plurality of backlight zones are driven according to the gray-scale clock signal and the drive data, the operations further comprise:

obtaining a frame synchronization signal; and the driving the plurality of backlight zones according to the gray-scale clock signal and the drive data comprises:

driving the plurality of backlight zones according to the gray-scale clock signal, the frame synchronization signal and the drive data.

12. The computer equipment as claimed in claim 11, wherein the local dimming data further comprises an index flag, and the operation of obtaining a frame synchronization signal further comprises:

generating the frame synchronization signal according to the index flag in the local dimming data.

13. The computer equipment as claimed in claim 12, wherein the local dimming data comprises an index field, a frame refresh rate field and a luminance data field, the frame refresh rate field is located between the index field and the luminance data field, the index field comprises the index flag, the frame refresh rate field comprises the frame refresh rate, and the luminance data field comprises the plurality of luminance data.

14. The computer equipment as claimed in claim 8, wherein before the plurality of backlight zones are driven according to the gray-scale clock signal and the drive data, the operations further comprise:

obtaining a frame synchronization signal; and the driving the plurality of backlight zones according to the gray-scale clock signal and the drive data comprises:

driving the plurality of backlight zones according to the gray-scale clock signal, the frame synchronization signal and the drive data.

15. A non-transitory computer readable storage medium, in which a computer program is stored, wherein the computer program, when being executed by a processor, causes the processor to perform operations to drive a backlight of a display panel, and the operations comprise:

generating local dimming data, the local dimming data comprising a frame refresh rate of the display panel and luminance data of each of the plurality of backlight zones;

generating a gray-scale clock signal according to the frame refresh rate in the local dimming data, a frequency of the gray-scale clock signal being matched with the frame refresh rate in the local dimming data;

generating drive data according to a plurality of luminance data in the local dimming data; and driving the plurality of backlight zones according to the gray-scale clock signal and the drive data, wherein the operation of generating a gray-scale clock signal according to the frame refresh rate in the local dimming data comprises:

determining a target frequency according to the frame refresh rate in the local dimming data by a formula:

$$GCLK\ \text{Rate} = \frac{P}{\frac{1}{\text{Frame rate}} - \text{Dummy time}}$$

wherein GCLK Rate represents the target frequency, P represents the number of gray-scale clock signals during a display of a frame of image by the display panel, Frame rate represents the frame refresh rate in the local dimming data, and Dummy time represents blanking time during the display of a frame of image by the display panel; and generating the gray-scale clock signal, wherein a frequency of the gray-scale clock signal is equal to the target frequency.

* * * * *